US006168730B1

(12) United States Patent
Nabeta et al.

(10) Patent No.: US 6,168,730 B1
(45) Date of Patent: Jan. 2, 2001

(54) STIMULABLE PHOSPHOR, PREPARATION METHOD THEREOF AND RADIATION IMAGE CONVERSION PANEL

(75) Inventors: Hiroyuki Nabeta; Kanae Kawabata; Hideaki Wakamatsu; Haruhiko Masutomi, all of Hino (JP)

(73) Assignee: Konica Corporation, Tokyo (JP)

( * ) Notice: Under 35 U.S.C. 154(b), the term of this patent shall be extended for 0 days.

(21) Appl. No.: 09/291,459

(22) Filed: Apr. 14, 1999

(30) Foreign Application Priority Data

Apr. 20, 1998 (JP) ................................................ 10-125297

(51) Int. Cl.⁷ ............................. C09K 11/61; C09K 11/55
(52) U.S. Cl. ............................. 252/301.4 H; 252/301.4 R
(58) Field of Search ....................... 252/301.4 H, 301.4 R

(56) References Cited

U.S. PATENT DOCUMENTS 5,639,399 * 6/1997 Iwase et al. .................. 252/301.4 H

FOREIGN PATENT DOCUMENTS 3-24189 * 2/1991 (JP) ................................. 252/301.4 H

* cited by examiner

Primary Examiner—C. Melissa Koslow
(74) Attorney, Agent, or Firm—Frishauf, Holtz, Goodman, Langer & Chick, P.C.

(57) ABSTRACT

A preparation method of an oxygen-introduced stimulable phosphor including a rare earth activated alkaline earth metal fluorohalide stimulable phosphor is disclosed, comprising the steps of heating a precursor of a stimulable phosphor in an atmosphere containing oxygen, and further heating the heated precursor in a weakly reducing atmosphere. Stimulable phosphors prepared by this method and a radiation image conversion panel by use thereof are also disclosed.

34 Claims, No Drawings

STIMULABLE PHOSPHOR, PREPARATION METHOD THEREOF AND RADIATION IMAGE CONVERSION PANEL

FIELD OF THE INVENTION

The present invention relates to a stimulable phosphor, a method for preparing the stimulable phosphor and a radiation image conversion panel comprising the stimulable phosphor.

BACKGROUND OF THE INVENTION

As a method replacing a conventional radiography, there is known a radiation image recording and reproducing method utilizing stimulable phosphor, as described in JP-A No. 55-12145 (herein, the term "JP-A" means an unexamined and published Japanese Patent Application). In the method, a radiation image converting panel (in other words, an image storage phosphor sheet) comprising a stimulable phosphor is employed, and the method comprises the steps of causing the stimulable phosphor of the panel to absorb radiation having passed through an object or having radiated from an object, sequentially exciting the stimulable phosphor with an electromagnetic wave such as visible light or infrared rays (hereinafter referred to as "stimulating rays") to release the radiation energy stored in the phosphor as light emission (stimulated emission), photoelectrically detecting the emitted light to obtain electric signals, and reproducing the radiation image of the object as a visible image from the electric signals. The panel having been read out is subjected to image-erasing and prepared for the next photographing cycle. Thus, the radiation image converting panel can be used repeatedly.

In the radiation image recording and reproducing methods described above, radiation image is advantageously obtained with a sufficient amount of information by applying radiation to an object at a considerably smaller dose, as compared to conventional radiography employing a combination of a radiographic film and a radiographic intensifying screen. Further, in the conventional radiography, the radiographic film is consumed for every photographing; on the other hand, in this radiation image converting method, in which the radiation image converting panel is employed repeatedly, is also advantageous in terms of conservation of resources and economic efficiency.

The radiation image converting panel employed in the radiation image recording and reproducing method basically comprises a support and provided thereon a phosphor layer (stimulable phosphor layer), provided that, in cases where the phosphor layer is self-supporting, the support is not necessarily required. The stimulable phosphor layer comprises a stimulable phosphor dispersed in a binder. There is also known a stimulable phosphor layer, which is formed by vacuum evaporation or a sintering process, free from a binder and comprises an aggregated stimulable phosphor. There is further known a radiation image converting panel in which a polymeric material is contained in the openings among the aggregated stimulable phosphor. On the surface of the stimulable phosphor layer (i.e., the surface which is not in contact with the support) is conventionally provided a protective layer comprising a polymeric film or an evaporated inorganic membrane to protect the phosphor layer from chemical deterioration and physical shock.

The stimulable phosphor, after being exposed to radiation, exhibits stimulated emission upon exposure to the stimulating ray. In practical use, phosphors are employed, which exhibit an emission within a wavelength region of 300 to 500 nm stimulated by stimulating light with wavelengths of 400 to 900 nm. Examples of the stimulable phosphors include rare earth activated alkaline earth metal fluorohalide phosphors described in JP-A Nos. 55-12145, 55-160078, 56-74175, 56-116777, 57-23673, 57-23675, 58-206678, 59-27289, 59-27980, 59-56479 and 59-56480; bivalent europium activated alkaline earth metal fluorohalide phosphors described in JP-A Nos. 59-75200, 6-84381, 60-106752, 60-166379, 60-221483, 60-228592, 60-228593, 61-23679, 61-120882, 61-120883, 61-120885, 61-235486 and 61-235487; rare earth element activated oxyhalide phosphors described in JP-A 55-12144; cerium activated trivalent metal oxyhalide phosphors described in JP-A No. 55-69281; bismuth activated alkaline metal halide phosphors described in JP-A No. 60-70484; bivalent europium activated alkaline earth metal halophosphate phosphors described in JP-A Nos. 60-141783 and 60-157100; bivalent europium activated alkaline earth metal haloborate phosphors described in JP-A No. 60-157099; bivalent europium activated alkaline earth metal hydrogenated halide phosphors described in JP-A 60-217354; cerium activated rare earth complex halide phosphors described in JP-A Nos. 61-21173 and 61-21182; cerium activated rare earth halophosphate phosphors described in JP-A No. 61-40390; bivalent europium activated cesium rubidium halide phosphors described in JP-A No. 60-78151; and bivalent europium activated complex halide phosphors described in JP-A No. 60-78151. Of these stimulable phosphors described above, iodide containing europium activated alkaline earth metal fluorohalide phosphors, iodide containing rare earth element activated oxyhalide phosphors and iodide containing bismuth activated alkaline metal halide phosphors exhibit stimulated emission with high luminance.

Along with advancement of utilization of the radiation image conversion method employing a stimulable phosphor, there have been desired further enhancements of radiation image quality such as enhanced sharpness and enhanced graininess. Effective as means for enhancing radiation image quality are making the stimulable phosphor grains finer and further homogenizing the grain size of the fine-grained phosphor, i.e., enhancing homogeneity of the grain size distribution of the fine-grained phosphor.

JP-A Nos. 9-291278 and 7-233369 disclose a method for preparing a stimulable phosphor in a liquid phase, in which a fine-grained stimulable phosphor precursor is obtained by adjusting the concentration of a phosphor raw material solution, providing an effective technique of preparing a homogeneous fine-grained phosphor powder. A stimulable phosphor can be prepared by further subjecting the thus prepared phosphor precursor to calcination at high temperature to obtain stimulated emission capability. However, it has been proved that the stimulated emission intensity achieved by conventionally known calcining methods was insufficient. The use of a stimulable phosphor with low emission intensity to prepare a radiation image conversion plate leads to reduced sensitivity of the radiation image conversion plate, producing a disadvantage such as increasing the dose necessary to obtain a radiation image having the same image quality.

Conventional Calcining Method of Precursor

A rare earth activated alkaline earth metal fluorohalide stimulable phosphor precursor, which has conventionally been prepared by the known liquid phase method, is subjected to calcination according to the following procedure. As is disclosed in JP-A 9-291278, dried precursor crystals are weighed and thereto is added fine-grained oxide powder as an anti-sintering agent, such super-fine alumina powder or super-fine silica powder. Subsequently, the resulting mixture is introduced into a refractory vessel such as a silica boat, an alumina crucible or a silica crucible and subjected to calcining in the core portion of an electric furnace, wherein the calcining temperature is optimally within the range of 400 to 1300° C. and the calcining time is 0.5 to 12 hrs. Calcining is conducted in a neutral atmosphere such as a nitrogen gas or argon gas atmosphere, or in a weakly reductive atmosphere such as a nitrogen gas atmosphere containing a small amount of hydrogen gas, or further in an atmosphere containing a small amount of oxygen.

The calcining method described above (so-called liquid phase process) is substantially the same as the method, in which a precursor comprised of raw material powder is directly subjected to calcining to obtain a stimulable phosphor, being so-called solid phase process. Preparation of the stimulable phosphor by the solid phase method is detailed in JP-B Nos. 1-26640, 63-55555 and 63-28955. The solid phase process is different from the method described above only in that material, a raw material powder mixture is calcined in stoichiometrically equivalent amounts. It was proved that the stimulated emission intensity of a stimulable phosphor obtained by the known method was insufficient.

SUMMARY OF THE INVENTION

An object of the present invention is to enhance a stimulated emission intensity of a stimulable phosphor.

Another object of the invention is to enhance a stimulated emission intensity of a stimulable phosphor comprised of fine particles with high homogeneity of the particle size distribution.

The above objects of the present invention can be accomplished by the following:

a preparation method of a stimulable phosphor comprising the steps of:

(1) heating a precursor of a stimulable phosphor, while exposing the precursor to an atmosphere containing oxygen, and then (2) further heating the heated precursor, while exposing the precursor to a weakly reducing atmosphere.

Further, preferred embodiments of the invention include:

1. a preparation method of a rare earth activated alkaline earth metal fluorohalide stimulable phosphor represented by the following formula (1):

formula (1)

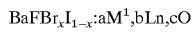

$BaFBr_xI_{1-x}:aM^1,bLn,cO$ wherein $M^1$ represents an alkali metal selected from the group consisting of Li, Na, K, Rb and Cs; Ln represents a rare earth element selected from the group consisting of Ce, Pr, Sm, Eu, Gd, Tb, Tm, Dy, Ho, Nd, Er and Yb; and x, a, b and c are numbers meeting the following conditions of $0 \leq x \leq 0.3$, $0 \leq a \leq 0.05$, $0 < b \leq 0.2$ and $0 < c \leq 0.1$; the method comprising the steps of:

1) preparing a precursor of the stimulable phosphor by a liquid phase process, 2) heating the stimulable phosphor precursor prepared in the step 1) at a temperature of not less than 300° C. for a period of at least 1 min., while exposing the precursor to an atmosphere containing oxygen, and then 3) heating the stimulable phosphor precursor exposed in the step 2) at a temperature of not less than 600° C. for a period of at least 30 min., while exposing the precursor to a weakly reducing atmosphere containing less than 100 ppm of oxygen;

2. the method for preparing a rare earth activated alkaline earth metal fluorohalide stimulable phosphor as described above, wherein the stimulable phosphor precursor prepared in the step (1) is further subjected to the process comprising:

2A) heating the stimulable phosphor precursor to a temperature of not less than 600° C. while exposing the stimulable phosphor precursor to an atmosphere containing not less than 100 ppm of oxygen, in which the percentage by volume of oxygen is less than that of a reducing component, based on the total volume of the atmosphere, and then 3A) holding the stimulable phosphor precursor in a weakly reducing atmosphere containing less than 100 ppm of oxygen for a period of at least 30 min., while maintaining a temperature at not less than 600° C., and thereafter cooling the stimulable phosphor precursor to a temperature of not more than 100° C., while maintaining the weakly reducing atmosphere containing not less than 100 ppm of oxygen;

3. the method for preparing a rare earth activated alkaline earth metal fluorohalide stimulable phosphor as described above, wherein the stimulable phosphor precursor prepared in the step (1) is further subjected to a process comprising:

2B) heating the stimulable phosphor precursor to a temperature of not less than 600° C. while exposing the stimulable phosphor precursor to an atmosphere containing less than 100 ppm of oxygen, then 2C) introducing oxygen into the atmosphere so that the oxygen content of the atmosphere is at least 100 ppm and the percentage by volume of oxygen is less than that of a reducing component, based on the total volume of the atmosphere, and holding the stimulable phosphor precursor therein for a period of at least 1 min., and then 3A) holding the stimulable phosphor precursor in a weakly reducing atmosphere containing less than 100 ppm of oxygen, while maintaining a temperature at not less than 600° C., and thereafter cooling the stimulable phosphor precursor to a temperature of not more than 100° C., while maintaining the weakly reducing atmosphere containing less than 100 ppm of oxygen;

4. a rare earth activated alkaline earth metal fluorohalide stimulable phosphor obtained by the preparation method described in above item 1, 2 or 3;

5. a radiation image conversion panel comprising a phosphor layer containing a stimulable phosphor, wherein the phosphor layer contains the rare earth activated alkaline earth metal fluorohalide stimulable phosphor described in item 4.

The rare earth activated alkaline earth metal fluorohalide stimulable phosphor obtained by the method described above is fine-grained, exhibiting high stimulated emission intensity, and using this stimulable phosphor, a radiation image conversion panel with high sensitivity and high image quality can be prepared.

DETAILED DESCRIPTION OF THE INVENTION

Representative embodiments of the method for preparing the stimulable phosphor according to the invention will be further described.

To prepare the stimulable phosphor precursor by the liquid phase process are employed a method for preparing a precursor described in JP-A No. 10-140148 and an apparatus for preparing a precursor described in JP-A No. 10-147778. In the present invention, the stimulable phosphor precursor refers to a material which barely exhibits stimulated emission or instantaneous emission. In case where a stimulable phosphor precursor is prepared by a liquid phase process, for example, the precursor is a material represented by formula (1) in a state prior to being subjected to a temperature of not less than 600° C. In cases of a stimulable phosphor prepared by a solid phase process, the precursor is stimulable phosphor material itself or a mixture thereof, or these materials in a state prior to being subjected to a temperature of not less than 600° C.

Next, the method for preparing the precursor by a liquid phase process according to the invention will be described. The present invention is applicable not only to calcination of a precursor obtained through a liquid phase process, but also to cases when stimulable phosphor raw materials are mixed and calcined to prepare a stimulable phosphor by a solid phase process. Specifically, the invention is preferably applied to the preparation of a stimulable phosphor precursor by a liquid phase process, thereby leading to enhancement of a stimulated emission intensity of a stimulable phosphor comprised of fine particles with high homogeneity of the particle size distribution.

The stimulable phosphor precursor used in the invention is preferably prepared by the following liquid phase preparation process.

Precursor Preparation

The method comprises the steps of:

preparing within a reaction vessel an aqueous mother liquor containing at least 1 mol/l $BaI_2$ (preferably, at least 1.35 mol/l $BaI_2$ more preferably at least 3.0 mol/l $BaI_2$, and still more preferably 3.0 to 4.5 mol/l $BaI_2$) and a halide of Ln, provided that when "a" of the formula (1) is not zero, the mother liquor further contains a halide of $M^1$, adding an aqueous solution containing a 5 mol/l or more (preferably not less than 8 mol/l, and more preferably 10 to 13 mol/l) inorganic fluoride (preferably, ammonium fluoride or alkaline metal fluoride) into the mother liquor, while maintaining the mother liquor at 50° C. or more (preferably, 80° C. or more) to form a crystalline precipitate of a precursor of the rare earth activated alkaline earth metal fluoroiodide stimulable phosphor, and separating the crystalline precipitate of the precursor from the mother liquor.

The stimulable phosphor precursor is preferably subjected to one of the following calcining processes to prepare the stimulable phosphor.

Calcining Process 1

The process comprises the steps of:

heating the stimulable phosphor precursor to a temperature of not less than 600° C. while exposing the stimulable phosphor precursor to an atmosphere containing not less than 100 ppm of oxygen, in which the percentage by volume of oxygen is less than that of a reducing component, based on the total volume of the atmosphere, and then holding the stimulable phosphor precursor in a weakly reducing atmosphere containing less than 1000 ppm (preferably less than 100 ppm) oxygen or containing no oxygen for a period of at least 30 min., while maintaining a temperature at not less than 600° C., and thereafter cooling the stimulable phosphor precursor to a temperature of not more than 100° C., while maintaining the weakly reducing atmosphere containing less than 1000 ppm (preferably less than 100 ppm) oxygen or containing no oxygen.

Calcining Process 2

The process comprises the steps of heating the stimulable phosphor precursor to a temperature of not less than 600° C. while exposing the stimulable phosphor precursor to a weakly reducing atmosphere containing less than 1000 ppm (preferably less than 100 ppm) of oxygen, then introducing oxygen into the reducing atmosphere so that oxygen is at least 100 ppm (preferably at least 1000 ppm) and the percentage by volume of oxygen is less than that of a reducing component, based on the total volume of the atmosphere, and holding the stimulable phosphor precursor therein for a period of at least 1 min., and then turning back the atmosphere and holding the stimulable phosphor precursor in a weakly reducing atmosphere containing less than 1000 ppm (preferably less than 100 ppm) of oxygen for a period of at least 30 min., while maintaining a temperature at not less than 600° C., and thereafter cooling the stimulable phosphor precursor to a temperature of not more than 100° C., while maintaining a weakly reducing atmosphere containing less than 1000 ppm (preferably less than 100 ppm) of oxygen.

The preparing method of the stimulable phosphor is further explained in detail below.

Preparation of a Precipitate of Precursor Crystals

Initially, material(s) except for a fluoride compound are dissolved in an aqueous medium. Thus, $BaX_2$ ($BaBr_2$, $BaI_2$) and a halide of Ln (and if necessary, a halide of $M^1$) are each added into an aqueous solvent and dissolved with stirring to prepare an aqueous solution. In this case, the amounts of Ba $X_2$ ($BaBr_2$, $BaI_2$) and the aqueous solvent are pre-adjusted so as to have 0.5 mol/l or more of a concentration of Ba $X_2$ ($BaBr_2$, $BaI_2$). A small amount of acid, ammonia, alcohol, water-soluble polymer or fine grained powder of water-insoluble metal oxide may be added thereto. The solution (reaction mother liquor) is maintained at 50° C.

Next, into the reaction mother liquor maintained at 50° C. with stirring, an aqueous solution of an inorganic fluoride (such as ammonium fluoride or alkaline metal fluoride is introduced through a pipe provided with a pump. The aqueous solution is preferably introduced to a portion in which stirring is vigorously performed. Introduction of the fluoride aqueous solution into the reaction mother liquor results in precipitation of precursor crystals of the rare earth activated alkaline earth metal fluorohalide phosphor represented by the formula (1).

The resulting crystals of the phosphor precursor are separated from the solution through filtration or centrifugation, washed sufficiently with liquid such as methanol and then dried. To the dried crystals of the phosphor precursor is added an anti-sintering agent such as fine alumina powder or fine silica powder, which adheres to the surface of the crystals. It is possible to save addition of the anti-sintering agent by selecting the calcination conditions.

Calcination of Phosphor Precursor Crystals

Further, the phosphor precursor crystals are charged into a heat-resistant vessel such as a silica port, an alumina crucible or a silica crucible and then placed in the core portion of an electric furnace to be calcined, without causing the crystals to sinter. The furnace core of an electric furnace is limited to those in which the atmosphere is replaceable during calcination. Preferably employed as the furnace is a moving bed type electric furnace, such as a rotary kiln.

From the precursor crystalline powder charged into the furnace core, a stimulable phosphor can be prepared preferably by the following calcining process.

Calcining Process 1

After charging the stimulable phosphor precursor into the furnace core, the atmosphere in the core of the furnace is replaced by an oxygen containing atmosphere, in which the percentage by volume of oxygen is less than that of a reducing component, based on the total volume of the atmosphere. In this case, prior to atmosphere replacement, the atmosphere in the core may be evacuated, for example, using a rotary evacuation pump. The evacuation improves atmosphere-replacing efficiency. In cases when replacing the atmosphere without evacuation (so-called forced replacement), it is necessary to introduce an atmosphere of at least 3 times the core volume.

In the invention, an atmosphere in which the percentage by volume of oxygen is less than that of a reducing component, is to be a gas mixture containing at least two components of the reducing component and oxygen. Taking into account safety concerns in handling of a gas mixture is preferred a mixed atmosphere containing an inert component in an amount more than that of the two components described above. Herein, the inert component is referred to as nitrogen or argon, and the reducing component is referred to as hydrogen. A mixed gas of nitrogen, hydrogen and oxygen is readily available and is preferred in terms of cost. The mixed ratio of nitrogen: hydrogen: oxygen is preferably, for example, 91:5:4. The hydrogen concentration of 5% or more is not preferable in terms of safety, should gas leaks occur. Another preferred ratio is 3% of the hydrogen concentration and 2% of the oxygen concentration.

After replacing the atmosphere inside of the furnace core with the mixed atmosphere described above, it is heated to at least 600° C. Heating to at least 600° C. is preferable to obtain superior emission characteristics. During the period of from the start of heating to taking-out the stimulable phosphor, the mixed atmosphere in the furnace core is preferably allowed to flow at a flow rate of at least 0.1 lit./min, and more preferably 1.0 to 5.0 lit./min. Thereby, the atmosphere in the core is replaced so that reaction products other than the stimulable phosphor produced in the core are removed. Specifically, in cases where the reaction products contain an iodide, yellowing of the stimulable phosphor due to the iodide and deterioration of stimulated emission due to yellowing can be prevented. The heating rate, depending on the material of the core pipe, the amount of precursor crystals and specification of the electric furnace, is preferably from 1° C./min. to 50° C./min.

After reaching 600° C. or more, the mixed atmosphere is returned to a weakly reducing atmosphere containing less than 1000 ppm (preferably 100 ppm) of oxygen and is further held for a period of at least 30 min., whereby reduction in stimulated emission characteristics of the phosphor can be prevented. The temperature is preferably from 600 to 1300° C., and more preferably from 700 to 1000° C. At a temperature of 600° C. or more, superior stimulated emission characteristics can be achieved, and at a temperature of 700° C. or more can be obtained preferred stimulated emission characteristics for radiographic diagnosis. Further, at a temperature of 1300° C. or less can be prevented larger particle formation due to sintering, and specifically at a temperature of 1000° C. or less can be obtained a stimulable phosphor with preferred particle size for radiographic diagnosis. More preferably the temperature is in the vicinity of 820° C. In this case, the atmosphere replacement is performed under forced flow, and the weakly reducing atmosphere newly introduced is preferably a mixed gas comprised of not more than 5% by volume of hydrogen, oxygen less than the hydrogen and nitrogen as the remainder. More preferably, the mixed gas is comprised of 0.1 to 3% hydrogen, oxygen with a concentration of 40 to 80% of the hydrogen and nitrogen as the remainder. Still more preferably, the mixed gas is comprised of 1% of hydrogen, 0.6% of oxygen and the remainder of nitrogen. At a hydrogen concentration of not less than 0.1% is obtained the reducing power, leading to enhance emission characteristics. Further, the hydrogen concentration of not more than 5% is preferred for handling, preventing crystals of the stimulable phosphor from being reduced. Furthermore, the oxygen concentration within the range above described enhances the stimulated emission intensity, and specifically at a concentration of 60% of the hydrogen, the emission intensity is markedly enhanced.

To expel oxygen, which has been introduced during heating and remains in the furnace core, until reaching levels of less than 1000 ppm (preferably less than 100 ppm), the flow rate of the weakly reducing gas introduced may temporarily be increased. The replacing efficiency is variable with the content of oxygen previously introduced. In cases of an atmosphere containing 1% by volume of oxygen, for example, when the weakly reducing gas with a volume of not less than 10 times the furnace core volume is introduced, oxygen is expelled to levels of less than 1000 ppm (preferably less than 100 ppm). After that, a weakly reducing atmosphere preferably containing less than 1000 ppm (more preferably less than 100 ppm) of oxygen is kept preferably for a period of at least 30 min, and more preferably 30 min. to 12 hrs. at a temperature of 600° C. "At least 30 min." results in a stimulable phosphor exhibiting superior stimulated emission characteristics, and "not more than 12 hr." leads to prevention of deterioration in stimulated characteristics due to overheating.

Cooling is conducted in a manner similar to the heating, in which a weakly reducing atmosphere preferably containing less than 1000 ppm (more preferably less than 100 ppm) of oxygen is maintained.

The desired stimulable phosphor can be obtained according to the calcination described above.

Calcining Process 2

Prior to heating, the atmosphere in the furnace core is replaced in a manner similar to Calcining process 1, except that the atmosphere is replaced by a weakly reducing atmosphere containing less than 1000 ppm (preferably less than 100 ppm) of oxygen. The weakly reducing atmosphere is preferably a mixture comprised of not more than 5% of hydrogen, oxygen less than the hydrogen and nitrogen as the remainder; and more preferably 0.1 to 3% of hydrogen, oxygen with a concentration of 40 to 80% of the hydrogen and nitrogen as the remainder. Specifically is still more preferred a gas mixture comprised of 1% of hydrogen, 0.6% of oxygen and nitrogen as the remainder. At a hydrogen concentration of not less than 0.1% is obtained the reducing power, leading to enhance emission characteristics. Further, the hydrogen concentration of not more than 5% is preferred for handling, preventing crystals of the stimulable phosphor from being reduced. Furthermore, the oxygen concentration within the range above described enhances the stimulated emission intensity, and specifically at a concentration of 60% of the hydrogen, the emission intensity is markedly enhanced.

After replacing the atmosphere in the core with the atmosphere described above, heating to 600° C. or higher is conducted, thereby leading to enhanced emission characteristics. During the period from the start of heating to taking-out the stimulable phosphor, the mixed atmosphere in the core is preferably allowed to flow at a flow rate of at least 0.1 l/min., and more preferably 1.0 to 5.0 lit./min. Thereby, the atmosphere in the furnace core is replaced and reaction products produced in the core other than a stimulable phosphor are removed. Specifically, in cases where the reaction products contain an iodide, yellowing of the stimulable phosphor due to the iodide and deterioration of stimulated emission due to yellowing can be prevented. The heating rate, depending on the material of the core pipe, the amount of precursor crystals and specification of the electric furnace, is preferably from 1° C./min. to 50° C./min.

After reaching 600° C. or more, oxygen is introduced, in which the percentage by volume of the oxygen is less than that of a reducing component, based on the total volume of the atmosphere and the atmosphere is further maintained for a period of at least 1 min., in which the temperature is preferably from 600 to 1300° C., and more preferably from 700 to 1000° C. At a temperature of 600° C. or more, superior stimulated emission characteristics can be achieved, and at a temperature of 700° C. or more can be obtained preferred stimulated emission characteristics for radiographic diagnosis. Further, at a temperature of 1300° C. or less can be prevented larger particle formation due to sintering, and specifically at a temperature of 1000° C. or less can be obtained a stimulable phosphor with preferred particle size for radiographic diagnosis. More preferably the temperature is in the vicinity of 820° C. In this case, the atmosphere replacement is performed under forced flow, and the weakly reducing atmosphere newly introduced is preferably a mixed gas comprised of not more than 5% by volume of hydrogen, oxygen less than the hydrogen and nitrogen as the remainder. More preferably, the mixed gas is comprised of 0.1 to 3% hydrogen, oxygen with a concentration of 40 to 80% of the hydrogen and nitrogen as the remainder. Still more preferably, the mixed gas is comprised of 1% of hydrogen, 0.6% of oxygen and the remainder of nitrogen. At a hydrogen concentration of not less than 0.1% is obtained the reducing power, leading to enhance emission characteristics. Further, the hydrogen concentration of not more than 5% is preferred for handling, preventing crystals of the stimulable phosphor from being reduced. Furthermore, the oxygen concentration within the range above described enhances the stimulated emission intensity, and specifically at a concentration of 60% of the hydrogen, the emission intensity is markedly enhanced. In this case, oxygen may be introduced into the furnace core atmosphere during heating, wherein the mixing ratio can be adjusted by the ratio of the flow rate of hydrogen/nitrogen mixed gas to that of oxygen. In place of oxygen, an atmosphere may be introduced as it is. Furthermore, the ratio of the flow rate of an oxygen/nitrogen-mixed gas to that of hydrogen/nitrogen-mixed gas may be adjusted.

Until reaching the desired mixing ratio of nitrogen, hydrogen and oxygen, a new atmosphere of at least 3 times the volume of the furnace core is preferably introduced. Further for at least 1 min., and preferably for 1 to 60 min., the mixed atmosphere of nitrogen, hydrogen and oxygen is maintained at a temperature of not less than 600° C.

After completing the procedure described above, the atmosphere in the furnace core is again replaced by a weakly reducing atmosphere. To expel all oxygen remaining in the core to levels of less than 1000 ppm (preferably less than 100 ppm), a weakly reducing gas used in the heating step is preferably employed. To enhance efficiency of replacement, the flow rate of the weakly reducing gas may be temporarily increased. When the weakly reducing gas is newly introduced in an amount of at least 10 times the volume of the furnace core, oxygen is expelled to levels of less than 1000 ppm (preferably less than 100 ppm). The weakly reducing atmosphere containing less than 1000 ppm (preferably 100 ppm) of oxygen is further maintained at a temperature of 600° C. or higher for a period of at least 30 min. and preferably for 30 min to 12 hrs. "At least 30 min." results in a stimulable phosphor exhibiting superior stimulated emission characteristics, and "not more than 12 hr." leads to prevention of deterioration in stimulated characteristics due to overheating. Cooling is conducted in a manner similar to the heating step.

The stimulable phosphor is thus obtained according to the calcination described above.

Preparation of Panel

As supports used in the radiation image converting panel according to the invention are employed a various types of polymeric material, glass and metals. Materials which can be converted to a flexible sheet or web are particularly preferred in handling as a information recording material. From this point, there are preferred plastic resin films such as cellulose acetate films, polyester films, polyamide films, polyimide films, triacetate films or polycarbonate films; metal sheets such as aluminum, iron, copper or chromium; or metal sheets having a said metal oxide covering layer.

A thickness of the support depends on properties of the material, and is generally 80 to 1000 $\mu$m and preferably 80 to 500 $\mu$m in terms of handling. The surface of the support may be glossy or may be matte for the purpose of enhancing adhesiveness to a stimulable phosphor layer. The support may be provided with a subbing layer under the stimulable phosphor layer for the purpose of enhancing adhesiveness to the phosphor layer.

Examples of binders used in the stimulable phosphor layer according to the invention include proteins such as gelatin, polysaccharide such as dextran, natural polymeric materials such as arabic gum and synthetic polymeric materials such as polyvinyl butyral, polyvinyl acetate, nitrocellulose, ethylcellulose, vinylidene chloride/vinyl chloride copolymer, polyalkyl (metha)acrylate, vinyl chloride/vinylacetate copolymer, polyurethane, cellulose acetate butyrate, polyvinyl alcohol and linear polyester. Of these binders are preferred nitrocellulose, linear polyester, polyalkyl (metha)acrylate, a mixture of nitrocellulose and linear polyester, a mixture of nitrocellulose and polyalkyl (metha)acrylate and a mixture of polyurethane and polyvinyl butyral. The binder may be cured with a cross-linking agent.

The stimulable phosphor layer can be coated on a subbing layer, for example, according to the following manner. Thus, an iodide-containing stimulable phosphor, a compound such a phosphite ester for preventing yellow stain and binder are added into an optimal solvent to prepare a coating solution in which phosphor particles and particles of the compound (s) are uniformly dispersed in a binder solution.

The binder is employed in an amount of 0.01 to 1 part by weight per 1 part by weight of the stimulable phosphor. A smaller amount of the binder is preferred in terms of sensitivity and sharpness of the radiation image converting panel and a range of 0.03 to 0.2 parts by weight is preferred in terms of easiness of coating.

A ratio of the binder to the stimulable phosphor (with the proviso that in the case of all of the binder being an epoxy group-containing compound, the ratio is that of the compound to the phosphor) depends on characteristics of the objective radiation image converting panel, the kind of the phosphor and an addition amount of the epoxy group-containing compound. Examples of solvents used for preparing the coating solution include lower alcohols such as methanol, ethanol, 1-propanol, 2-propanol, and n-butanol;

chlorine-containing hydrocarbons such as methylene chloride and ethylene chloride; ketones such as acetone, methyl ethyl ketone, methyl isobutyl ketone; esters of a lower fatty acid and lower alcohol such as methyl acetate, ethyl acetate and butyl acetate; ethers such as dioxane, ethylene glycol ethyl ether and ethylene glycol monomethyl ether; toluene; and a mixture thereof.

Examples of solvents used for preparing a coating solution of a stimulable phosphor layer include lower alcohols such as methanol, ethanol, isopropanol and n-butanol; ketones such as acetone, methyl ethyl ketone, methyl isobutyl ketone and cyclohexanone; esters of a lower fatty acid and lower alcohol such as methyl acetate, ethyl acetate and butyl acetate; ethers such as dioxane, ethylene glycol ethyl ether and ethylene glycol monomethyl ether; aromatic compounds such as tolyol and xylol; halogenated hydrocarbons such as methylene chloride and ethylene chloride; and a mixture thereof.

There may be incorporated, in the coating solution, a variety of additives, such as a dispersing agent for improving dispersibility of the phosphor in the coating solution and a plasticizer for enhancing bonding strength between the binder and phosphor. Examples of the dispersing agent include phthalic acid, stearic acid, caproic acid and oleophilic surfactants. Examples of the plasticizer include phosphate esters such as triphenyl phosphate, tricresyl phosphate and diphenyl phosphate; phthalate esters such as diethyl phthalate, dimethoxyethyl phthalate; glycolic acid esters such as ethylphthalyethyl glycolate and dimethoxyethyl glycolate; and polyesters of polyethylene glycol and aliphatic dibasic acid such as polyester of triethylene glycol and adipinic acid, and polyester of diethylene glycol and succinic acid.

There may be incorporated, in a coating solution of the stimulable phosphor layer, stearic acid, phthalic acid, caproic acid and oleophilic surfactants for the purpose of improving dispersibility of the stimulable phosphor particles. The plasticizer may optionally incorporated. Examples of the plasticizer include phthalate esters such as diethyl phthalate and dibutyl phthalate; aliphatic dibasic acid esters such as diisodecyl succinate and dioctyl adipinate; and glycolic acid eaters such as ethylphthalylethyl glycolate and butylphthalylbutyl glycolate.

The coating solution as prepared above was uniformly coated on the surface of the subbing layer to form a coating layer. Coating can be carried out by conventional coating means, such as doctor blade, roll coater and knife coater. Subsequently, the coated layer is gradually dried to complete formation of the stimulable phosphor layer on the subbing layer. The coating solution of the stimulable phosphor layer can be prepared by using a dispersing apparatus, such as a ball mill, sand mill, atriter, three-roll mill, high-speed impeller, Kady mill and ultrasonic homogenizer. The prepared coating solution is coated on a support by using a doctor blade, roll coater or knife coater and dried to form the stimulable phosphor layer. After the above coating solution may be coated on a protective layer and dried, the stimulable phosphor layer may be adhered to the support. A thickness of the stimulable phosphor layer of the radiation image converting panel depends on characteristics of the converting panel, the kind of the stimulable phosphor and a mixing ratio of the binder to the stimulable phosphor, and is generally 20 μm to 1000 μm and preferably 20 to 500 μm.

Exemplary explanations of the stimulable phosphor have mainly concerned europium activated barium fluoroiodide. By reference thereto, however, there can be prepared europium activated barium fluorobromide, or stimulable phosphors represented by the following formula 1 or formula (1) and other stimulable phosphors:

formula 1

wherein $M^2$ represents a metal selected from the group consisting of Mg, Ca, Sr, Zn and Cd; X represents a halogen selected from the group consisting of Cl, Br and I; $M^1$ represents an alkali metal selected from the group consisting of Li, Na, K, Rb and Cs; Ln represents a rare earth element selected from the group consisting of Ce, Pr, Sm, Eu, Gd, Tb, Tm, Dy, Ho, Nd, Er and Yb; and y, a, b and c are numbers meeting the following conditions of $0 \leq y \leq 0.6$, $0 \leq a \leq 0.05$, $0 < b \leq 0.2$ and $0 < c \leq 0.1$;

formula (1)

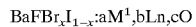

wherein $M^1$ represents an alkali metal selected from the group consisting of Li, Na, K, Rb and Cs; Ln represents a rare earth element selected from the group consisting of Ce, Pr, Sm, Eu, Gd, Tb, Tm, Dy, Ho, Nd, Er and Yb; x, a, b and c are numbers meeting the following conditions of $0 \leq x \leq 0.3$, $0 \leq a \leq 0.05$, $0 < b \leq 0.2$ and $0 < c \leq 0.1$. According to the present invention, enhancement of the stimulated emission intensity can be achieved, leading to enhanced sensitivity. Specifically, a phosphor precursor prepared by a liquid phase process is preferably calcined according to the method of the invention, leading to stimulable phosphor particles with homogeneous size distribution and enhanced stimulated emission intensity, that is, enhancements of sensitivity and graininess. More preferably, stimulable phosphors represented by the above-described formula 1 or formula (1) can be prepared according to the calcining process of the invention.

EXAMPLES

The present invention will be further explained, based on examples.

Example 1

(Calcining Process 1)

A stimulable phosphor precursor of europium activated barium fluoroiodide was prepared as follows. To a reactor vessel were added 2,500 ml of an aqueous $BaI_2$ solution (1.75 mol/l) and 125 ml of an aqueous $EuI_3$ solution (0.07 mol/l). This reaction mother liquor was kept at 83° C. with stirring. To the reaction mother liquor was added 250 ml of an aqueous ammonium fluoride solution (8 mol/l) using a roller pump to form a precipitate. After completing addition, the reaction mixture was further kept at this temperature for 2 hrs. with stirring to ripening the precipitate. After separating the precipitate by filtration, the precipitate was washed with methanol and dried by a vacuum drier to obtain crystals of europium activated barium fluoroiodide. To prevent variation in grain form and grain size distribution due to sintering during calcination, super fine-grained alumina powder was added in an amount of 1% by weight and sufficiently stirred with a mixer to allow the super-fine alumina powder to uniformly be adhered onto the surface of the crystals.

A mixture of europium activated barium fluoroiodide crystalline powder and alumina super fine grains was charged into a quartz core tube with a volume of 10 liters of a batch type rotary kiln. A gas mixture comprised of 93% nitrogen, 5% hydrogen and 2% oxygen was flowed at a flow rate of 10 l/min. for a period of 20 min. to replace an atmosphere. After sufficiently replacing an atmosphere in the core, the flow rate of the gas mixture of 93% nitrogen, 5% hydrogen and 2% oxygen was decreased to 2 l/min. and the temperature was raised to 850° C. at a temperature increasing rate of 10° C./min. with rotating the core tube at a rate of 2 rpm. After reaching a temperature of 850° C., a gas mixture comprised of 95% nitrogen and 5% hydrogen was flowed at a flow rate of 10 l/min. for 20 min. with maintaining a temperature at 850° C. to replace an atmosphere. Thereafter, the flow rate of the gas mixture of 95% nitrogen and 5% hydrogen was decreased to 2 l/min. and the atmosphere was maintained further for 90 min. The atmosphere was cooled to 25° C. at a temperature decreasing rate of 10° C./min. and then, replaced by the air to obtain oxygen-introduced europium activated barium fluoroiodide stimulable phosphor particles. The thus obtained phosphor particles were sieved and the measurement with scanning type electron micrograph revealed that a mean particle size was 3 µm.

Preparation of Radiation Image Conversion Panel

The prepared phosphor of europium activated barium fluoroiodide of 427 g, a polyurethane resin (Desmorack 4125, trade name, produced by Sumitomo-Bayer Urethane Co.) of 15.8 g and bisphenol A-type epoxy resin of 2.0 g were added into a mixed solvent of methyl ethyl ketone and toluene (1:1) and dispersed by a propeller mixer and a coating solution of a phosphor layer with a viscosity of 25 to 30 PS. The coating solution was coated on a subbed polyethylene terephthalate film by using a doctor blade and dried at 100° C. for 15 min. and a phosphor layer with 200 µm in thickness was formed.

Fluoro-resin, fluoroolefin-vinyl ether copolymer (Lumiflon LF100, trade name, produced by Asahi Glass Co.) of 70 g, cross-linking agent, isocyanate (Desmodule Z4370, trade name, produced by Sumitomo-Bayer Urethane Co.) of 25 g bisphenol A-type epoxy resin of 5 g and silicone resin fine powder (KMP-590, trade name, produced by Shinetsu Kagaku Co., average particle size of 1 to 2 µm) of 10 g were added into a mixed solvent of toluene-isopropyl alcohol (1:1) and a coating solution of a protective layer was obtained. The coating solution was coated on the formed phosphor layer by using a doctor blade and dried at 120° C. for 30 min. to thermally harden the layer and a protective layer with a thickness of 10 µm was obtained. According to the above procedure, there was obtained a radiation image converting panels comprising a stimulable phosphor layer with a given thickness.

Example 2

(Calcining Process 2)

Stimulable phosphor precursor crystals of europium activated barium fluoroiodide were obtained according to the method described in Example 1.

A mixture of europium activated barium fluoroiodide crystalline powder and alumina super fine grains, which was obtained according to the method described in Example 1, was charged into a quartz core tube with a volume of 10 liters of a batch type rotary kiln. A gas mixture comprised of 95% nitrogen and 5% hydrogen was flowed at a flow rate of 10 l/min. for a period of 20 min. to replace an atmosphere. After sufficiently replacing an atmosphere in the core, the flow rate of the gas mixture of 95% nitrogen and 5% hydrogen was decreased to 2 l/min. and the temperature was raised to 850° C. at a temperature increasing rate of 10° C./min. with rotating the core tube at a rate of 2 rpm.

After reaching a temperature of 850° C., a gas mixture comprised of 93% nitrogen, 5% hydrogen and 2% oxygen was flowed at a flow rate of 10 l/min. for 20 min. with maintaining a temperature at 850° C. to replace an atmosphere. Thereafter, the flow rate of the gas mixture of 93% nitrogen, 5% hydrogen and 2% oxygen was decreased to 2 l/min. and the atmosphere was maintained further for 20 min.

Then, a gas mixture comprised of 95% nitrogen and 5% hydrogen was flowed at a flow rate of 10 l/min. for 20 min. to replace an atmosphere. After sufficiently replacing the atmosphere in the core, the flow rate of the gas mixture of 95% nitrogen and 5% hydrogen was decreased to 2 l/min. and the atmosphere was maintained further for 60 min.

The atmosphere was cooled to 25° C. at a temperature decreasing rate of 10° C./min., while maintaining a flow rate of the mixture of 95% nitrogen and 5% hydrogen and then, replaced by the air to obtain oxygen-doped europium activated barium fluoroiodide stimulable phosphor particles. The thus obtained phosphor particles were sieved and the measurement with scanning type electron micrograph revealed that a mean particle size was 3 µm.

Using the phosphor particles described above, a radiation image conversion panel having a stimulable phosphor was obtained according to the method described in Example 1.

Comparative Example 1

Stimulable phosphor precursor crystals of europium activated barium fluoroiodide were obtained according to the method described in Example 1.

A mixture of europium activated barium fluoroiodide crystalline powder and alumina super fine grains, which was obtained according to the method described in Example 1, was charged into a quartz core tube with a volume of 10 liters of a batch type rotary kiln. A gas mixture comprised of 95% nitrogen and 5% hydrogen was flowed at a flow rate of 10 l/min. for a period of 20 min. to replace an atmosphere. After sufficiently replacing an atmosphere in the core, the flow rate of the gas mixture of 95% nitrogen and 5% hydrogen was decreased to 2 l/min. and the temperature was raised to 850° C. at a temperature increasing rate of 10° C./min. with rotating the core tube at a rate of 2 rpm. After maintained at 850° C. for 2 hrs., the atmosphere was cooled to room temperature (ca. 25° C.) at a temperature decreasing rate of 10° C./min. to obtain europium activated barium fluoroiodide. The thus obtained phosphor particles were sieved and the measurement with scanning type electron micrograph revealed that a mean particle size was 3 µm.

Using the phosphor particles described above, a radiation image conversion panel having a stimulable phosphor was obtained according to the method described in Example 1.

Comparative Example 2

Stimulable phosphor precursor crystals of europium activated barium fluoroiodide were obtained according to the method described in Example 1.

A mixture of europium activated barium fluoroiodide crystalline powder and alumina super fine grains, which was obtained according to the method described in Example 1, was charged into a quartz core tube with a volume of 10 liters of a batch type rotary kiln. A gas mixture comprised of 93% nitrogen, 5% hydrogen and 2% oxygen was flowed at a flow rate of 10 l/min. for a period of 20 min. to replace an atmosphere. After sufficiently replacing an atmosphere in the core, the flow rate of the gas mixture of 93% nitrogen, 5% hydrogen and 2% oxygen was decreased to 2 l/min. and the temperature was raised to 850° C. at a temperature increasing rate of 10° C./min. with rotating the core tube at a rate of 2 rpm. After maintained at 850° C. for 2 hrs., the atmosphere was cooled to room temperature at a temperature decreasing rate of 10° C./min. to obtain europium activated barium fluoroiodide. The thus obtained phosphor particles were sieved and the measurement with scanning type electron micrograph revealed that a mean particle size was 3 μm.

Using the phosphor particles described above, a radiation image conversion panel having a stimulable phosphor was obtained according to the method described in Example 1.

Comparative Example 3

Stimulable phosphor precursor crystals of europium activated barium fluoroiodide were obtained according to the method described in Example 1.

175.3 g $BaF_2$ powder, 391.1 g $BaI_2$ and 0.418 g $EuF_3$ powder were each weighed, and were grounded and mixed in an automatic mortar. The resulting mixture was charged into a quartz core tube with a volume of 10 liters of a batch type rotary kiln. A gas mixture comprised of 95% nitrogen and 5% hydrogen was flowed at a flow rate of 10 l/min. for a period of 20 min. to replace an atmosphere. After sufficiently replacing an atmosphere in the core, the flow rate of the gas mixture of 95% nitrogen and 5% hydrogen was decreased to 2 l/min. and the temperature was raised to 850° C. at a temperature increasing rate of 10° C./min. with rotating the core tube at a rate of 2 rpm. After maintained at 850° C. for 2 hrs., the atmosphere was cooled to room temperature at a temperature decreasing rate of 10° C./min. to obtain europium activated barium fluoroiodide. The thus obtained phosphor particles were sieved and the measurement with scanning type electron micrograph revealed that a mean particle size was 10 μm.

Using the phosphor particles described above, a radiation image conversion panel having a stimulable phosphor was obtained according to the method described in Example 1.

Example 3

A stimulable phosphor precursor of europium activated barium fluoroiodide was prepared as follows. To a reactor vessel were added 2,500 ml of an aqueous $BaI_2$ solution (4.0 mol/l) and 26.5 ml of an aqueous $EuI_3$ solution (0.2 mol/l). This reaction mother liquor was kept at 83° C. with stirring. To the reaction mother liquor was added 322 ml of an aqueous ammonium fluoride solution (8 mol/l) using a roller pump to form a precipitate. After completing addition, the reaction mixture was further kept at this temperature for 2 hrs. with stirring to ripening the precipitate. After separating the precipitate by filtration, the precipitate was washed with methanol and dried by a vacuum drier to obtain crystals of europium activated barium fluoroiodide. To prevent variation in grain form and grain size distribution due to sintering during calcination, super fine-grained alumina powder was added in an amount of 1% by weight and sufficiently stirred with a mixer to allow the super fine-grained alumina powder to uniformly be adhered onto the surface of the crystals.

The resulting mixture of the stimulable phosphor precursor and super-fine alumina powder was calcined according to the method of Example 1 to obtain stimulable phosphor particles with an average particle size of 2 μm.

Using the phosphor particles, a radiation image conversion panel having a stimulable phosphor was prepared according to the procedure described in Example 1.

Example 4

A crystalline europium activated barium fluoroiodide was obtained in a manner similar to Example 3. Thus obtained stimulable phosphor precursor was mixed with a super-fine alumina powder and the mixture thereof was calcined according to the method of Example 2 to obtain stimulable phosphor particles with an average particle size of 2 μm. Using the phosphor particles, a radiation image conversion panel having a stimulable phosphor was prepared according to the procedure described in Example 1.

Comparative Example 4

A crystalline europium activated barium fluoroiodide was obtained in a manner similar to Example 3. Thus obtained stimulable phosphor precursor was mixed with a super-fine alumina powder and calcined according to the method of Comparative Example 1 to obtain stimulable phosphor particles with an average particle size of 3 μm. Using the phosphor particles, a radiation image conversion panel having a stimulable phosphor was prepared according to the procedure described in Example 1.

Comparative Example 5

A crystalline europium activated barium fluoroiodide was obtained in a manner similar to Example 3. Thus obtained stimulable phosphor precursor was mixed with a super-fine alumina powder and calcined according to the method of Comparative Example 1 to obtain stimulable phosphor particles with an average particle size of 3 μm. Using the phosphor particles, a radiation image conversion panel having a stimulable phosphor was prepared according to the procedure described in Example 1.

Example 5

175.3 g $BaF_2$ powder, 391.1 g $BaI_2$ and 0.418 g $EuF_3$ powder were each weighed, and were grounded and mixed in an automatic mortar. The thus-obtained mixture was calcined according to the method of Example 1 to obtain stimulable phosphor particles with an average particle size of 7 μm. Using the phosphor particles, a radiation image conversion panel having a stimulable phosphor was prepared according to the procedure described in Example 1.

Example 6

175.3 g $BaF_2$ powder, 391.1 g $BaI_2$ and 0.418 g $EuF_3$ powder were each weighed, and were grounded and mixed in an automatic mortar. The thus-obtained mixture was calcined according to the method of Example 2 to obtain stimulable phosphor particles with an average particle size of 7 μm. Using the phosphor particles, a radiation image conversion panel having a stimulable phosphor was prepared according to the procedure described in Example 1.

Comparative Example 6

175.3 g $BaF_2$ powder, 391.1 g $BaI_2$ and 0.418 g $EuF_3$ powder were each weighed, and were grounded and mixed in an automatic mortar. The thus-obtained mixture was calcined according to the method of Comparative Example 2 to obtain stimulable phosphor particles with an average particle size of 10 μm. Using the phosphor particles, a radiation image conversion panel having a stimulable phosphor was prepared according to the procedure described in Example 1.

Evaluation of Radiation Image Conversion Panel

With respect to sensitivity, the panel was exposed to X-rays at 80 KVp and then excited by the light of a He-Ne laser (633 nm). Then, the stimulated emission emitted from the phosphor layer was captured by a detector (photomultiplier with a spectral sensitivity of S-5) to measure the intensity of the emission. The sensitivity is shown as a relative value in Table 1.

With respect to graininess, the panel was exposed to X-rays at 80 kVp through a lead MTF chart and then excited by the He-Ne laser. Thereafter, the stimulated emission emitted from the phosphor layer was measured and converted to electric signals. The electric signals were recorded on a conventional photographic film through a film scanner and the resulting photographic image was visually evaluated with respect to graininess, by comparison to the graininess of a conventional X-ray photographic image (hereinafter, denoted as an S/F image), which was obtained by using an intensifying screen and an X-ray photographic film. In Table 1, a grade of B means graininess substantially equal to that of the image obtained by conventional X-ray photography using the intensifying screen and photographic film; a grade of A means superior graininess. A grade of C means rather coarse graininess and a grade of D means markedly coarse graininess.

TABLE 1

| Sample | Graininess | Sensitivity |
| --- | --- | --- |
| Example 1 | B | 1.2 |
| Example 2 | B | 1.1 |
| Comp. Example 1 | C | 0.8 |
| Comp. Example 2 | C | 0.4 |
| Comp. Example 3 | D | 1.0 |

Similarly, evaluation was made with respect to graininess, sharpness and total image quality, based on the following criteria:

Graininess, Sharpness
 4: Superior to an S/F image
 3: The same level as an S/F image
 2: Inferior to an S/F image, but at a level posing no problem for diagnosis
 1: Markedly inferior to an S/F image and at a level which will pose problems for diagnosis Total Imege Quality
 8: Superior to an S/F image
 6–7: The same level as an S/F image
 4–5: Inferior to an S/F image, but at a level posing no problem for diagnosis
 1–3; Markedly inferior to an S/F image and at a level which will pose problems for diagnosis Results are shown in Table 2.

TABLE 2

| Sample | Graininess | Sharpness | Total image quality |
| --- | --- | --- | --- |
| Example 1 | 3 | 3 | 6 |
| Example 2 | 3 | 3 | 6 |
| Comp. Example 1 | 3 | 1 | 4 |
| Comp. Example 2 | 3 | 1 | 4 |
| Comp. Example 3 | 1 | 2 | 3 |
| Example 3 | 4 | 4 | 8 |
| Example 4 | 4 | 4 | 8 |
| Comp. Example 4 | 3 | 1 | 4 |
| Comp. Example 5 | 3 | 1 | 4 |
| Example 5 | 2 | 4 | 6 |
| Example 6 | 2 | 4 | 6 |
| Comp. Example 6 | 1 | 1 | 2 |

As can be seen from Tables 1 and 2, it is proved that Examples according to the present invention exhibited superior image characteristics.

What is claimed is:

1. A method for preparing a rare earth activated alkaline earth metal fluoride of a stimulable phosphor comprising the steps of:
 (1) heating a precursor of the stimulable phosphor, while exposing the precursor to an atmosphere containing oxygen, and then
 (2) further heating the heated precursor, while exposing the precursor to a weakly reducing atmosphere.

2. The method of claim 1, wherein in the step (1), said precursor is heated at a temperature of not less than 300° C., while exposing the precursor to an atmosphere containing oxygen.

3. The method of claim 2, wherein in the step (2), the heated precursor is heated at a temperature of not less than 600° C. while exposing the precursor to the weakly reducing atmosphere.

4. The method of claim 1, wherein the oxygen content of the weakly reducing atmosphere is from 0 to less than 1000 ppm.

5. The method of claim 4, wherein the oxygen content is 0 to less than 100 ppm.

6. The method of claim 2, wherein in the step (1), said precursor is heated for a period of at least 1 min.

7. The method of claim 3, wherein in the step (2), said precursor is heated for a period of at least 30 min.

8. The method of claim 1, wherein said precursor in the step (1) is one which was previously prepared by a liquid phase process.

9. The method of claim 1, wherein in the step (1), said precursor is heated to a temperature of not less than 600° C. while exposing said precursor to an atmosphere containing at least 100 ppm of oxygen, in which the percentage by volume of oxygen is less than that of a reducing component, based on the total volume of the atmosphere.

10. The method of claim 9, wherein after the step (2), the method further comprises the step of:
 (3) cooling the heated precursor to a temperature of not more than 100° C. while exposing the precursor to the weakly reducing atmosphere,
 and wherein in the step of (2), said precursor is held in a weakly reducing atmosphere for a period of at least 30 min., while maintaining a temperature of the atmosphere at not less than 600° C.

11. The method of claim 10, wherein the oxygen content of the weakly reducing atmosphere is from 0 to less than 1000 ppm.

12. The method of claim 11, wherein the oxygen content is from 0 to less than 100 ppm.

13. The method of claim 1, wherein the method further comprises the steps of
 (1A) prior to the step (1), heating said precursor while exposing the precursor to a weakly reducing atmosphere and
 (3) after the step (2), cooling the heated precursor to a temperature of not more than 100° C. while exposing the precursor to the weakly reducing atmosphere.

14. The method of claim 13, wherein the step (1) comprises:
 introducing oxygen into the atmosphere so that the oxygen of the atmosphere is at least 100 ppm of oxygen and the percentage by volume of oxygen is less than that of a reducing component, based on the total volume of the atmosphere, and holding said precursor therein for a period of at least 1 min.

15. The method of claim 14, wherein the oxygen content of the weakly reducing atmosphere is from 0 to less than 1000 ppm.

16. The method of claim 15, wherein the oxygen content is from 0 to less than 100 ppm.

17. The method of claim 1, wherein said stimulable phosphor comprises Ba, F, XA, Ln and O, in which XA is at least one selected from the group consisting of F, Cl, Br, I, At, Yb and No; and Ln is at least one selected from the group consisting of Ce, Pr, Sm, Eu, Gd, Tb, Tm, Dy, Ho, Nd, Er and Yb.

18. The method of claim 17, wherein said stimulable phosphor is represented by the following formula 1:

formula 1

$$(Ba_{1-y}M^2_y)FX:aM^1,bLn,cO$$

wherein $M^2$ represents a metal selected from the group consisting of Mg, Ca, Sr, Zn and Cd; X represents at least a halogen selected from the group consisting of Cl, Br and I; $M^1$ represents an alkali metal selected from the group consisting of Li, Na, K, Rb and Cs; Ln represents a rare earth element selected from the group consisting of Ce, Pr, Sm, Eu, Gd, Tb, Tm, Dy, Ho, Nd, Er and Yb; and y, a, b and c are numbers meeting the following conditions of $0 \leq y \leq 0.6$, $0 \leq a \leq 0.05$, $0 < b \leq 0.2$ and $0 < c \leq 0.1$.

19. The method of claim 18, wherein said stimulable phosphor is represented by the following formula (1):

formula (1)

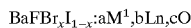
$$BaFBr_xI_{1-x}:aM^1,bLn,cO$$

wherein $M^1$ represents an alkali metal selected from the group consisting of Li, Na, K, Rb and Cs; Ln represents a rare earth element selected from the group consisting of Ce, Pr, Sm, Eu, Gd, Tb, Tm, Dy, Ho, Nd, Er and Yb; and x, a, b and c are numbers meeting the following conditions of $0 \leq x \leq 0.3$, $0 \leq a \leq 0.05$, $0 < b \leq 0.2$ and $0 < c \leq 0.1$.

20. A preparation method of a rare earth activated alkaline earth metal fluorohalide stimulable phosphor represented by the following formula (1):

formula (1)

$$BaFBr_xI_{1-x}:aM^1,bLn,cO$$

wherein $M^1$ represents an alkali metal selected from the group consisting of Li, Na, K, Rb and Cs; Ln represents a rare earth element selected from the group consisting of Ce, Pr, Sm, Eu, Gd, Tb, Tm, Dy, Ho, Nd, Er and Yb; and x, a, b and c are numbers meeting the following conditions of $0 \leq x \leq 0.3$, $0 \leq a \leq 0.05$, $0 < b \leq 0.2$ and $0 < c \leq 0.1$; the method comprising the steps of:

1) preparing a precursor of the stimulable phosphor by a liquid phase process, 2) heating the prepared stimulable phosphor precursor at a temperature of not less than 300° C. for a period of at least 1 min., while exposing said precursor to an atmosphere containing oxygen, and then 3) further heating the stimulable phosphor precursor at a temperature of not less than 600° C. for a period of at least 30 min. while exposing a weakly reducing atmosphere containing less 100 ppm of oxygen.

21. A rare earth activated alkaline earth metal fluorohalide stimulable phosphor prepared by a method comprising the steps of:

(1) heating a precursor of a stimulable phosphor, while exposing the precursor to an atmosphere containing oxygen, and then (2) further heating the heated precursor, while exposing the precursor to a weakly reducing atmosphere.

22. A radiation image conversion panel having a phosphor layer comprising a rare earth activated alkaline earth metal fluorohalide stimulable phosphor, said stimulable phosphor being prepared by a method comprising the steps of:

(1) heating a precursor of a stimulable phosphor, while exposing the precursor to an atmosphere containing oxygen, and then (2) further heating the heated precursor, while exposing the precursor to a weakly reducing atmosphere.

23. A method for preparing a rare earth activated alkaline earth metal fluoride stimulable phosphor comprising the steps of:

heating a stimulable phosphor precursor of said stimulable phosphor to a temperature of not less than 600° C., while exposing the stimulable phosphor precursor to an atmosphere containing not less than 100 ppm of oxygen, in which the percentage by volume of oxygen is less than that of a reducing component, based on the total volume of the atmosphere, and holding the stimulable phosphor precursor in a weakly reducing atmosphere containing less than 1000 ppm of oxygen for a period of at least 30 min., while maintaining a temperature at not less than 600° C., and thereafter cooling the stimulable phosphor precursor to a temperature of not more than 100° C., while maintaining the weakly reducing atmosphere containing less than 1000 ppm of oxygen.

24. A method for preparing a rare earth activated alkaline earth metal fluoride stimulable phosphor comprising the steps of:

heating a stimulable phosphor precursor of said stimulable phosphor to a temperature of not less than 600° C. while exposing the stimulable phosphor precursor to a weakly reducing atmosphere containing less than 1000 ppm of oxygen, then introducing oxygen into the reducing atmosphere so that the oxygen of the atmosphere is at least 100 ppm and the percentage by volume of oxygen is less than that of a reducing component, based on the total volume of the atmosphere, and holding the stimulable phosphor precursor therein for period of at least 1 min., and then holding the stimulable phosphor precursor in a weakly reducing atmosphere containing less than 1000 ppm of oxygen for a period of at least 30 min. while maintaining a temperature at not less than 600° C., and thereafter cooling the stimulable phosphor precursor to a temperature of not more than 100° C., while maintaining the weakly reducing atmosphere containing less than 1000 ppm of oxygen.

25. A method for preparing a rare earth activated alkaline earth metal fluoride stimulable phosphor comprising the steps of:

(1) preparing a precursor of the stimulable phosphor by a liquid phase process, (2) heating the prepared stimulable phosphor precursor at a temperature of not less than 600° C. for a period of at least 1 min., while exposing said precursor to an atmosphere containing at least 100 ppm of oxygen, in which the percentage by volume of oxygen is less than that of a reducing component, based on the total volume of the atmosphere, and then (3) further heating the heated stimulable phosphor precursor at a temperature of not less than 600° C. for a period of a least 30 min. while exposing the precursor to a weakly reducing atmosphere containing less 100 ppm of oxygen.

26. The method of claim 25, wherein said stimulable phosphor comprises Ba, F, XA, Ln and O, in which XA is at least one selected from the group consisting of F, Cl, Br, I, At, Yb and No; and Ln is at least one selected from the group consisting of Ce, Pr, Sm, Eu, Gd, Tb, Tm, Dy, Ho, Nd, Er and Yb.

27. The method of claim 26, wherein said stimulable phosphor is represented by the following formula (1):

formula (1)

$(Ba_{1-y}M^2_y)FX:aM^1,bLn,cO$ wherein y, a, b and c are numbers meeting the following conditions of $0 \leq y \leq 0.6$, $0 \leq a \leq 0.5$, $0 < b \leq 0.2$ and $0 < c \leq 0.1$; $M^2$ represents a metal selected from the group consisting of Mg, Ca, Sr, Zn and Cd; X represents at least a halogen selected from the group consisting of Cl, Br and I; $M^1$ represents an alkali metal selected from the group consisting of Li, Na, K, Rb and Cs; and Ln represents a rare earth element selected from the group consisting of Ce, Pr, Sm, Eu, Gd, Tb, Tm, Dy, Ho, Nd, Er and Yb.

28. The method of claim 25, wherein after the step (2), the method further comprises the step of:

(2a) cooling the heated precursor to a temperature of not more than 100° C. while exposing the precursor to the weakly reducing atmosphere, and wherein in said step (2), said precursor is held in a weakly reducing atmosphere for a period of at least 30 min., while maintaining a temperature of the atmosphere at not less than 600° C.

29. The method of claim 28, wherein the oxygen content of the weakly reducing atmosphere is from 0 to less than 1000 ppm.

30. The method of claim 29, wherein the oxygen content is from 0 to less than 100 ppm.

31. The method of claim 25, wherein the method further comprises the steps of (1a) prior to the step (1), heating said precursor while exposing the precursor to a weakly reducing atmosphere and (2a) after the step (2), cooling the heating precursor to a temperature of not more than 100° C. while exposing the precursor to the weakly reducing atmosphere.

32. The method of claim 31, wherein the step (1) comprises:

introducing oxygen into the atmosphere so that the oxygen of the atmosphere is a least 100 ppm of oxygen and the percentage by volume of oxygen is less than that of a reducing component, based on the total volume of the atmosphere, and holding said precursor therein for a period of at least 1 min.

33. The method of claim 32, wherein the oxygen content of the weakly reducing atmosphere is from 0 to less than 1000 ppm.

34. The method of claim 33, wherein the oxygen content is from 0 to less than 100 ppm.

* * * * *